Jan. 14, 1941.                B. C. ROBERTSON                2,228,642
                    ADJUSTABLE MOUNT FOR PRINTER LAMPS
                           Filed May 28, 1938
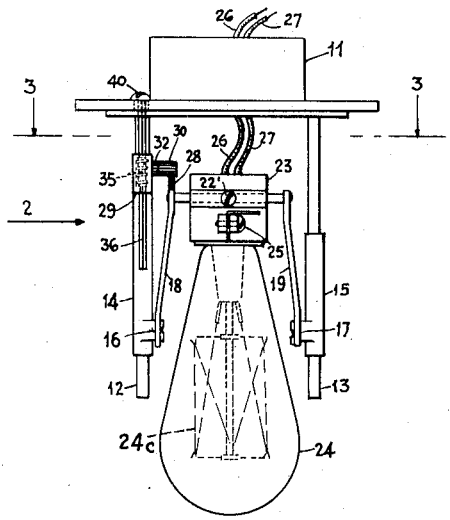
Fig. 1.
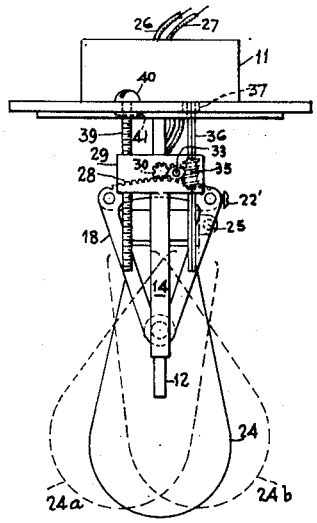
Fig. 2.
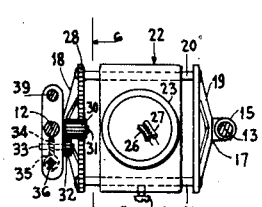
Fig. 3.
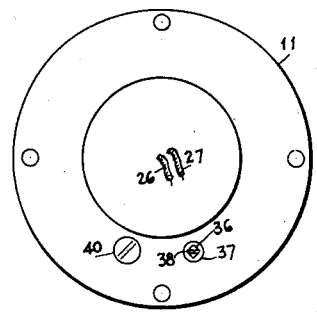
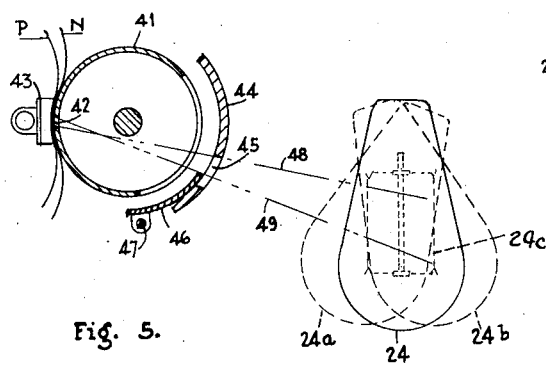
Fig. 5.
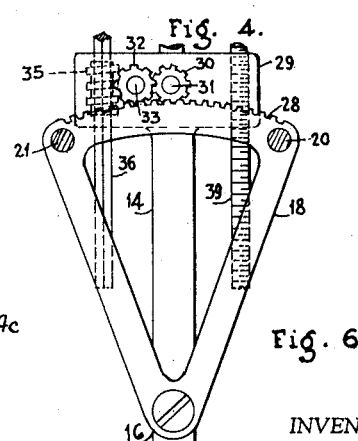
Fig. 6.
INVENTOR.
Benjamin C. Robertson,
BY
       ATTORNEY.

Patented Jan. 14, 1941

2,228,642

UNITED STATES PATENT OFFICE 2,228,642

ADJUSTABLE MOUNT FOR PRINTER LAMPS

Benjamin Christian Robertson, North Hollywood, Calif., assignor to Twentieth Century-Fox Film Corporation, Los Angeles, Calif., a corporation of New York Application May 28, 1933, Serial No. 210,683

7 Claims. (Cl. 95—75)

This invention relates to film printers and deals particularly with an improved means for mounting the printing lamp in a certain type of printer.

The invention to be described hereinafter has been designed and embodied in a well known type of film printer, but the invention is not to be considered as being confined to this particular type of printer, since it may be employed in other types of printers and even in other fields, with slight modification, without altering the principles of the invention.

In the type of printer under discussion the light is admitted to the films through a printing aperture. Interposed between the light and the printing aperture is a shutter controlled aperture for controlling the amount of light admitted to the printing aperture. To those versed in the art of printing motion picture films, it is known that the printing light must be accurately calibrated and maintained at this calibrated point in order to produce prints of the proper density. After the light has been calibrated, the different density steps on the printer are controlled by the shutter. In addition, it is necessary to bring these different printing steps on the printer into registration as closely as possible with corresponding steps made on a standard density printing machine. In practice it has been found difficult to bring the intermediate steps into registration, even when the initial and final steps register accurately. For this reason I conceived of the idea of progressively varying the light intensity in conjunction with the shutter control. This is done by swinging the lamp on a pivot so that the angular relation of the lamp to the shutter control may be changed and the distance of the lamp from the shutter may also be made to vary. These two features in combination with a shutter controlled aperture may be so arranged that the shutter puts the major control effect on that part of the light source that is varied both in distance and angular relation to the aperture. The over-all result is a light control that may be made to progressively vary the light intensity in different zones in the range of light intensities required for printing. With this arrangement I am enabled to place a precise variable control upon the light that reaches the films. Accordingly, it becomes the object of this invention to provide a mounting for a printer lamp whereby the lamp may be swung on a pivot. Another object of the invention consists in providing an adjustable mount for a printer lamp in conjunction with a variable aperture, whereby the lamp may be swung on a pivot so as to change both the distance of the lamp from the aperture and the angular position of the lamp with respect to the aperture. Other objects, such as the vertical adjustment of the lamp, and the lateral adjustment of the lamp, together with other features of construction, will become apparent as the description proceeds in conjunction with the drawing, in which:

Figure 1 is a side elevation showing my lamp mounting attached to a part of the printer machine.

Figure 2 is a view of Figure 1 taken in the direction of the arrow 2.

Figure 3 is a view of Figure 1 taken on line 3—3.

Figure 4 is a top plan view of Figure 2.

Figure 5 is a diagrammatic view showing the relation of the printer lamp to the shutter controlled aperture and the printing aperture with the lamp shown in various positions by dotted lines.

Figure 6 is an enlarged fragmentary view taken on line 6—6 of Figure 3.

Briefly stated, the invention comprises means for mounting a printer lamp whereby the lamp itself may be swung on a pivot and also moved vertically and laterally for adjustment. In Figures 1 and 2, I have shown the means whereby I accomplish these adjustments. In these views I have shown the lamp as being mounted upon a cap 11, which is a part of the printer construction, not shown, and in this case is the closure cap for the printer lamp housing. It is to be understood that in actual construction the lamp extends into the housing and is supported on the cap as shown. The housing is large enough to allow the lamp to swing into the two positions as shown by the dotted lines in Figure 2. No other part of the printer is shown in these views, inasmuch as the printer itself is not a part of the invention. Depending from the cap 11 are two rods 12 and 13 and slidably mounted upon the two rods 12 and 13 are two sleeves 14 and 15 respectively. The rods 14 and 15 carry pivot points 16 and 17, upon which arms 18 and 19, respectively, are pivotally mounted. The upper ends of the arms 18 and 19 are connected by cross-rods 20 and 21 and upon the cross-rods 20 and 21 a carriage 22 is slidably mounted. The movement of the carriage 22 is for lateral adjustment of the lamp and a screw 22' is provided for holding the carriage in fixed positions. The carriage 22 carries a suitable receptacle 23, into which a lamp 24 having an elongated filament 24c is mounted and held in place by a clamping screw 25. Current is supplied to the lamp through flexible conductors 26 and 27, which extend through the cap 11 and to any suitable electrical supply.

As stated above, the arms 18 and 19 are pivotally mounted upon the lugs 16 and 17, which allows the lamp to be swung upon a pivot in one plane. As will be noted, the pivot point is approximately at the top of the source of light; namely, the filament, the purpose of which will be explained later. The means for swinging the lamp upon the pivot are best shown in Figures 2, 3 and 6. In these views it will be observed that the arm 18 is formed with an arcuate rack 28 on the top thereof and that the sleeve 14 is formed with a T extension 29 on the top portion, which carries the mechanism for swinging the lamp. In Figure 3 it can be seen that this mechanism consists of a pinion gear 30, rotatably mounted upon a pin 31 on the T section 29, said pinion gear 30 being arranged to mesh with the rack 28. The pinion gear 30 in turn is driven by a gear 32, which is mounted upon a shaft 33, said shaft 33 being mounted in the T section and driven by a worm wheel 34, which is driven by a worm 35 suitably mounted in the T section 29. Since the sleeves 14 and 15 are slidably mounted on the rods 12 and 13 and since the worm 35 is carried by the movement of the sleeve 14, it is necessary to provide a sliding drive for the worm 35. In order to provide the utmost in convenience and arrangement, I have arranged the drive for the worm 35 so that it extends through the cap 11 and is manipulated from the outside of the lamp housing. This arrangement consists of a square rod 36, which slidably extends through a square opening in the worm 35, and is supported in any suitable manner, such as by a ferrule 37, on the cap 11 so that it will not slide longitudinally in the cap. The upper end of the rod 36 is provided with a screwdriver slot 38 for purposes of turning. With this arrangement it is obvious that by turning the rod 36 by means of the slot 38, the worm 35 is rotated, which in turn rotates the worm wheel 34 and drives the gear 32, which meshes with the gear 30. The gear 30 being in mesh with rack 28 will swing the whole lamp assembly upon the pivot points on the lugs 16 and 17.

As before stated, the invention also includes means for vertical adjustment of the lamp. This means is best shown in Figures 2 and 4. Here it will be observed that a screw-threaded rod 39 extends through the T section 29 and has a screw-threaded engagement therewith. The upper end of the rod 39 is formed with a screw-head 40 and is held against longitudinal movement in the cap 11 in any suitable manner, such as by means of a collar 41 fixed to the rod 39. By turning the rod 39, the whole assembly may be moved vertically on the rods 12 and 13. The foregoing adjustments provide means for properly positioning the light in the printer and for varying the light to bring about the required light intensities for precisely printing the different steps required in printing film.

The actual operation of the swinging adjustment is diagrammatically illustrated in Figure 5. In this view I have shown a printing drum 41 having a printing aperture 42 therein. A printer gate 43 of the conventional order is arranged to hold a negative film N and a positive film P in contact as they pass the printing aperture. It will be noted that the printing drum 41 is cut away on the rear side to permit light to pass through the aperture 42. In addition, the printer is equipped with a plate 44 having an aperture 45 therein for controlling the light to the printing aperture 42. Over the aperture 45 there is a shutter 46, operable by a rod 47 for sliding the shutter over the aperture 45 for controlling the amount of light passing through the aperture. The lamp 24 is positioned substantially as shown and is mounted upon the cap 11 with the mounting previously described. The cap and the cap mounting are not shown in this view, since it would be merely a repetition of Figure 2. However, the dotted positions of the lamp are shown to illustrate the result of swinging the lamp on a pivot. In order to illustrate the advantages of the swinging movement of the lamp, let us consider the lamp in the dotted positions 24a and 24b. With the shutter 46 placed in the position shown, it is obvious that light will pass to the printing aperture 42 over the range of the light source indicated by the broken lines 48 and 49 and that, no matter what position the lamp is, the same angle of light interception will be maintained with the shutter in this position. Therefore, when the lamp is swung from the position 24a to the position 24b, it is obvious that the lower part of the light source is swung a greater distance from the aperture than the upper part of the light source. Since light varies with the square of the distance, this movement of itself will give a considerable variation in light, but in addition to this variation the shutter control operates to shut off that part of the light which has been subject to the greatest variation by distance. Furthermore, the angular relation of the light source to the shutter controlled aperture has been varied, which introduces another light variation subject to control by the shutter. The combination of these controls permits an operator to regulate his range of control so that the light intensity may be decreased more rapidly in the higher intensities than in the lower intensities, or vice versa. With an arrangement of this nature, the lamp may be regulated so that the printing steps on the printer may be made to more closely conform to the printing steps on the standard density printing machine, and the lamp may be maintained in adjustment with a minimum of trouble.

I claim:

1. In a photographic printer having a printer lamp housing, a closure cap for said housing, and a printer lamp adjustably mounted on said cap, said adjustable mount including a pair of depending rods mounted on said cap, slidable sleeves on said rods, arms pivotally mounted on said sleeves, a carriage mounted on said arms and means for swinging said arms on their pivotal supports, said means including a rack on one of said arms, a pinion on one of said sleeves adapted to mesh with said rack, and means for rotating said pinion.

2. In a photographic printer having a printing aperture and a light controlling aperture spaced therefrom, the combination of: a movable shutter adapted to adjustably cover said light controlling aperture, a printing lamp arranged to transmit light rays through said apertures, said lamp having an elongated filament arranged substantially parallel to the movement of said shutter, an adjustable mount for said lamp comprising means for swinging said lamp on a pivot to vary the angular relation of said filament to said light controlling aperture, and means for moving said shutter to successively intercept light rays from that part of the filament that has been most changed with respect to distance from said shutter.

3. In a photographic printer having a printing aperture and a light controlling aperture spaced therefrom, the combination of: a movable shutter adapted to adjustably cover said light controlling aperture, a printing lamp arranged to transmit light rays through said apertures, said lamp having an elongated source of light extending substantially parallel to the movement of said shutter, means for swinging said lamp to vary the distance of one end of said source of light more than the other end from said aperture, and means for moving said shutter to successively intercept light rays from that part of said source of light which has been most moved.

4. In a photographic printer having a light controlling aperture for regulating the amount of light transmitted through a printing aperture, an elongated light source adapted to transmit light through said light controlling aperture to said printing aperture, means for swinging said light source to vary the angular relation and distance of said light source with respect to said light controlling aperture, and means for shuttering said light controlling aperture to successively intercept light rays from the end of said elongated light source that has been most moved.

5. In a motion picture printer having a printing lamp housing, means for adjustably mounting a printing lamp within said housing, said means including a pair of rods mounted within said housing, a slidable sleeve on each of said rods, an arm pivotally mounted on each of said sleeves, a lamp carriage supported by said arms, a segmental gear on one of said arms, a pinion on one of said sleeves adapted to mesh with said gear, and means for rotating said pinion to swing said lamp carriage on the pivot points of said arms.

6. In a motion picture printer having a printing lamp housing, means for adjustably mounting a printing lamp within said housing, said means including a pair of rods mounted within said housing, a slidable sleeve on each of said rods, an arm pivotally mounted on each of said sleeves, a lamp carriage supported by said arms, means for swinging said lamp carriage on the pivotal point of said arms, a rod rotatably mounted in said housing and held against longitudinal movement therein screw-threadedly engaging one of said sleeves, and means for turning said rod to move said sleeves on said first mentioned rods.

7. The elements of claim 6, wherein said last mentioned means includes a gear train arranged to drive said pinion, and means externally of said housing for rotating said gear train.

BENJAMIN CHRISTIAN ROBERTSON.